(12) United States Patent
Golani et al.

(10) Patent No.: US 9,602,370 B2
(45) Date of Patent: Mar. 21, 2017

(54) DETERMINING OVERALL NETWORK HEALTH AND STABILITY

(71) Applicant: Cisco Technology, Inc., San Jose, CA (US)

(72) Inventors: Jitendra Golani, Milpitas, CA (US); Sandeep Dhingra, Sunnyvale, CA (US); Sameer Padhye, Bangalore (IN)

(73) Assignee: Cosco Technology, Inc., San Jose, CA (US)

( * ) Notice: Subject to any disclaimer, the term of this patent is extended or adjusted under 35 U.S.C. 154(b) by 582 days.

(21) Appl. No.: 14/145,527

(22) Filed: Dec. 31, 2013

(65) Prior Publication Data

US 2014/0122709 A1    May 1, 2014

Related U.S. Application Data

(63) Continuation of application No. 13/048,809, filed on Mar. 15, 2011, now Pat. No. 8,645,102, which is a continuation of application No. 11/946,745, filed on Nov. 28, 2007, now Pat. No. 7,933,743.

(51) Int. Cl.
   *G06F 11/30*     (2006.01)
   *H04L 12/26*     (2006.01)

(52) U.S. Cl.
   CPC .......... *H04L 43/08* (2013.01); *H04L 12/2602* (2013.01); *H04L 43/00* (2013.01); *H04L 43/087* (2013.01); *H04L 43/0823* (2013.01); *H04L 43/0829* (2013.01); *H04L 43/0852* (2013.01)

(58) Field of Classification Search
   CPC . H04L 43/0823; H04L 12/2602; H04L 43/00; H04L 43/0829; H04L 43/0852; H04L 43/087; H04L 41/046; H04L 41/06; H04L 41/142; H04L 41/22; H04L 43/045; H04L 43/08; H04L 43/0817; H04L 43/0876; G06F 11/2294; G06F 11/3006; G06F 11/3055; G06F 11/3093; G06F 11/328; G06F 11/3495; G06F 21/552
   USPC .... 702/183, 184, 185, 186; 709/224; 714/57
   See application file for complete search history.

(56) References Cited

U.S. PATENT DOCUMENTS

| | | | |
|---|---|---|---|
| 5,819,028 A | 10/1998 | Manghirmalani et al. | |
| 7,933,743 B2 * | 4/2011 | Golani | H04L 12/2602 702/183 |
| 8,645,102 B2 | 2/2014 | Golani et al. | |

* cited by examiner

*Primary Examiner* — John H Le
(74) *Attorney, Agent, or Firm* — Hickman Palermo Becker Bingham LLP (57) ABSTRACT

A network health analyzer that analyzes health of a computer network may be implemented in accordance with an embodiment of the present invention. A network profile including an issue profile and one or more benchmarks appropriate for the network is determined. A set of numeric measures that is common to all issues in the issue profile is established. The network health analyzer collects data points pertaining to the operation of the network. Based on the data points, numeric values corresponding to the numeric measures may be calculated. In turn, health indexes for all issues in the issue profile may be determined. Based on these health indexes for the issues, an overall health rating may be determined.

20 Claims, 5 Drawing Sheets

DETERMINING OVERALL NETWORK HEALTH AND STABILITY

CLAIM OF PRIORITY

This application claims domestic priority under 35 U.S.C. §120 as a Continuation of prior U.S. patent application Ser. No. 13/048,809, filed on Mar. 15, 2011, which in turn claims domestic priority under 35 U.S.C. §120 as a Continuation of prior U.S. patent application Ser. No. 11/946,745, filed on Nov. 28, 2007, the entire contents of which are hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

TECHNICAL FIELD

The present disclosure relates generally to network communications and network management.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Typical network management and administration solutions focus on improving network availability. Using such a network management and administration solution, a service provider may monitor service availability of its network in real-time or near real time and perform control actions on the network to enhance the service availability when any service outage has been detected. Thus, if a direct network link between New York and Tokyo is relatively congested, but if a network link between New York and London, and a network link between London and Tokyo have ample unused capacity, the service provider may re-route some traffic between New York and Tokyo to an alternate route between New York and Tokyo by way of London. Clearly, the more such alternative routes are used, even though the network availability may be maintained, the less optimal the service may be (for example, large packet losses, long delays and unpredictable jitters may be associated with the alternative routes) and the more costly the network is to be maintained. Congestion in the original link (New York, Tokyo) and the delays in the alternative links (New York, London, Tokyo) represent degradation in the overall network health, although there is no significant impact to availability.

Thus, similar to a car that may not be in an optimal condition even if it is able to run between point A and point B, a network is not necessarily a healthy network even if it still carries traffic. Just as a car without outward symptoms may fail over time, a network without proactive monitoring may develop various problems over time.

DESCRIPTION OF EXAMPLE EMBODIMENTS

Techniques for analyzing and monitoring network health are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Analyzing and Monitoring Network Health
   3.1 Example Network Health Analyzer
   3.2 Example Operations
4.0 Implementation Mechanisms—Hardware Overview
5.0 Extensions and Alternatives

1.0 General Overview

The needs identified in the foregoing Background, and other needs and objects that will become apparent for the following description, are achieved in the present invention, which comprises, in one embodiment, a system comprising a network health analyzer for analyzing health of a computer network.

One objective for an operator of a computer network (such as a service provider network) is how to ensure that a network is up and running in a manner that services are not disrupted, outages are minimized, and service quality and commitment are assured, when the network generates a large amount of noise traffic such as syslog messages emitted by various applications or systems in the network or when there are problems that will degrade the network into serious problems over time. Since a computer network is an evolving complex of applications, services, devices and spans, detailed problem-by-problem analyses over an extended period may contain too many non-comparable fine details to tell if an overall health of the network is improving or deteriorating.

In some embodiments, the overall health of the network can be represented by an overall health rating. Furthermore, rationales that support the overall health rating are deduced on a set of issues that is appropriate for the profile of the network. The rationales also lead to prognosis as well as recommendations related to the network health. Thus, the operator of the network may make an informed decision about some of the pressing issues facing the network and what can be done about them.

Such an overall health rating may be repeatedly determined over an extended time. Hence, the operator will be able to see whether the network health is improving or deteriorating, whether recommendations work or not, whether an issue that has been neglected or procrastinated develops into serious complications or not, etc., in a rational and comparable manner.

As used herein, the term "network health" does not just mean network availability, but also includes, but is not limited to, the network's ability to restore to a sustainable state of healthy balance. Benchmarks defining such a sustainable state of healthy balance (or a baseline health state) may be determined following an analysis of the computer network that results in a determination of an appropriate network profile. For example, for a network with a particular network profile, re-routing traffic may not cause any impact on network availability. Indeed, some amount of re-routing traffic may indicate the network is being efficiently used. However, extensive and/or prolonged re-routing may indicate some issues that are manifested within or without the network (for instance, latency that may cause signaling traffic to experience relatively frequent timeout problems in a service subscriber's VoIP application). Therefore, even if network availability is not impacted, and/or even if a resultant issue impacts entities outside the network, and/or even if there are no apparent symptoms, and/or even if there are only chronic service impact issues (but few acute service impact issues), a proactive check is needed to determine whether the network is operating in a healthy manner for its intended purposes.

In some embodiments, knowledge obtained from technical review of network design, technical analysis of device performance and compliance data, syslog message reporting, or network operation monitoring may be analyzed and stored in a database manually, and/or in a programmatic manner. Based on this established and growing knowledge base, different issue profiles that correspond to different network profiles may be developed. As used herein, an "issue profile" may include, but is not limited to, a list of issues, an array of issues, an issue tree, other representations of network issues, etc. Likewise, numeric measures applicable to an issue in an issue profile may also be established to determine, for example, application criticality and the extent of impact of the issue. Recommendations to improve the network health with respect to one or more issues in the issue profile may also be placed in the knowledge base. These issue profiles, numeric measures and recommendations are not static, or limited to specific areas, but rather can be further evolved and expanded.

In some embodiments, once determined as appropriate for a network, a network profile may be associated with an issue profile described above and a definition of a baseline health state. The baseline health state comprises a set of benchmarks. Data collected from the network may be compared with the set of benchmarks defining the baseline health state, resulting in one or more data points that may be used by the network health analyzer described above to deduce the overall health rating. For example, deviations or degradations from these benchmark value ranges are considered as symptoms of the network being in a possibly unhealthy state. Thus, the more severe the deviations or degradations are, the more unhealthy the network is. In some embodiments, data points indicating compliances, deviations or degradations may be used to derive a number of risk indexes. Based on the risk indexes, an overall health rating may be computed. In a particular embodiment, the larger a value of the overall health rating is (say, on a scale of 1 through 10), the less the network's operation deviates from the baseline health state.

In some embodiments, the techniques for analyzing network health described herein may be implemented using one or more computer programs executing on a network infrastructure element, such as a switch, a router, a multiplexer, etc., that is established in a network. In some embodiments, the techniques described herein may be implemented by an appliance computer system that is operatively and/or communicatively coupled to a network infrastructure element, such as a switch, a router, a multiplexer, or an add-drop multiplexer. In some embodiments, the techniques described herein may be implemented on a host computer system that is communicatively connected to a network. Thus, the embodiments described herein illustrate examples and are not restrictive.

2.0 Structural and Functional Overview

In an embodiment a system to analyze and monitor health of a computer network may be implemented in any type of computing device. For example, the functionality of the example system may be implemented as a set of instructions executed by a processor. Alternatively or additionally, such functionality may be implemented as hard-wired logic components, such as in an ASIC or an FPGA. The computer network that is monitored and analyzed may be any type of computer network. The computer network may comprise switches, routers, bridges, hubs, end stations, wireless access points, wireless devices, etc.

Figure 1A:
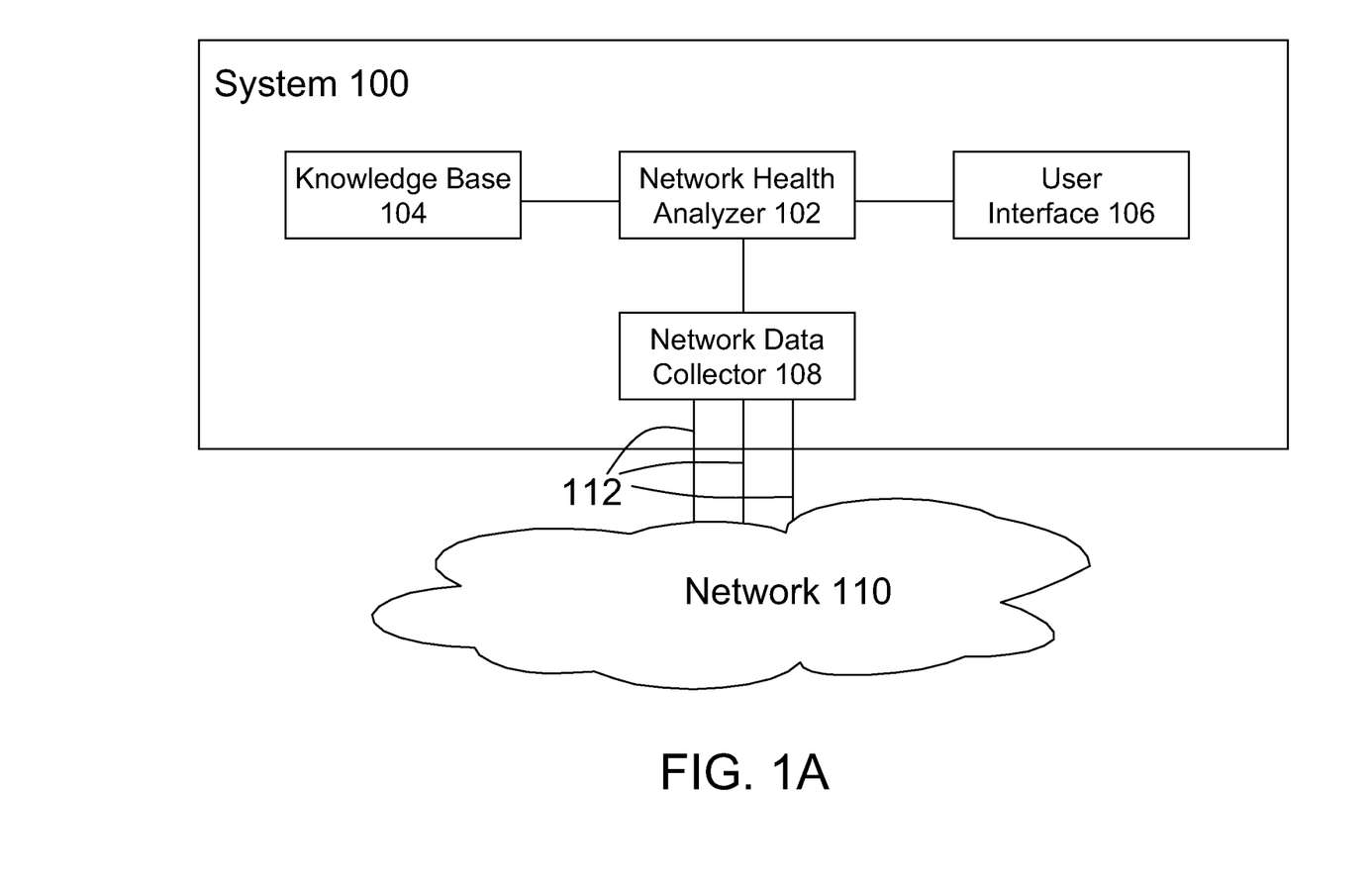
FIG. 1A and FIG. 1B illustrate example system embodiments operable to analyze network health.

FIG. 1A illustrates an example system operable to analyze network health of a computer network.

As shown in FIG. 1A, the system 100 comprises a network health analyzer 102, a knowledge base 104, a user interface 106, and a network collector 108 that collects data from a network 110 whose health is to be analyzed by network health analyzer 102. As illustrated in FIG. 1A, network data collector 108 has multiple communication links 112 to monitored network 110. Links 112 may use different physical interfaces or speeds or distances (such as LAN, metro, or WAN links). Through links 112, network data collector 108 receives different types of data from the network 110.

The data may include, but are not limited to, real time raw traffic data, real time raw statistical data, non-real time (processed) statistical data, long-term trend data, provisioning data, configuration data, control plane data, event and alarm data, etc. For example, the data may include CPU usage, memory usage, end-to-end measurement data such as delays, jitter, packet loss, bit error rate, etc. The data from the network 110 may be periodically collected automatically. The data may be collected as the data is spontaneously emitted or when the data is requested by the network health analyzer 102 or the network data collector 108. Apart from the data collected from the network, sources of data other than the network may also be used to provide information about the network 110 to the network health analyzer 102.

The knowledge base 104 may store issue profiles for different network profiles. The system 100 may provide a user interface for consultants, network managers, administrators, or other authorized personnel to input, enhance, modify, or delete an issue profile or other parameters (such as weight, criticality, etc.) and thresholds associated with the issue profile. The data stored in this knowledge base 104 may be provided to the network health analyzer 102 for the purpose of determining an appropriate health index of the network 110. Issue profiles are further described below.

The user interface 106 may be used by the system to receive input for any parameters, thresholds, or adjustments of any parameters and thresholds in the issue profile, and may display the result of network health analysis from the network health analyzer 102 to a user.

The network health analyzer 102 may communicate with other entities of the system (100) directly or indirectly through communication links established among the network health analyzer and the other entities of the system. In addition, the network health analyzer may communicate with the network 110 through the network data collector (108) or another entity that has one or more communication links with the network 110.

3.0 Analyzing and Monitoring Network Health

3.1 Example Network Profile Analyzer

Figure 1B:
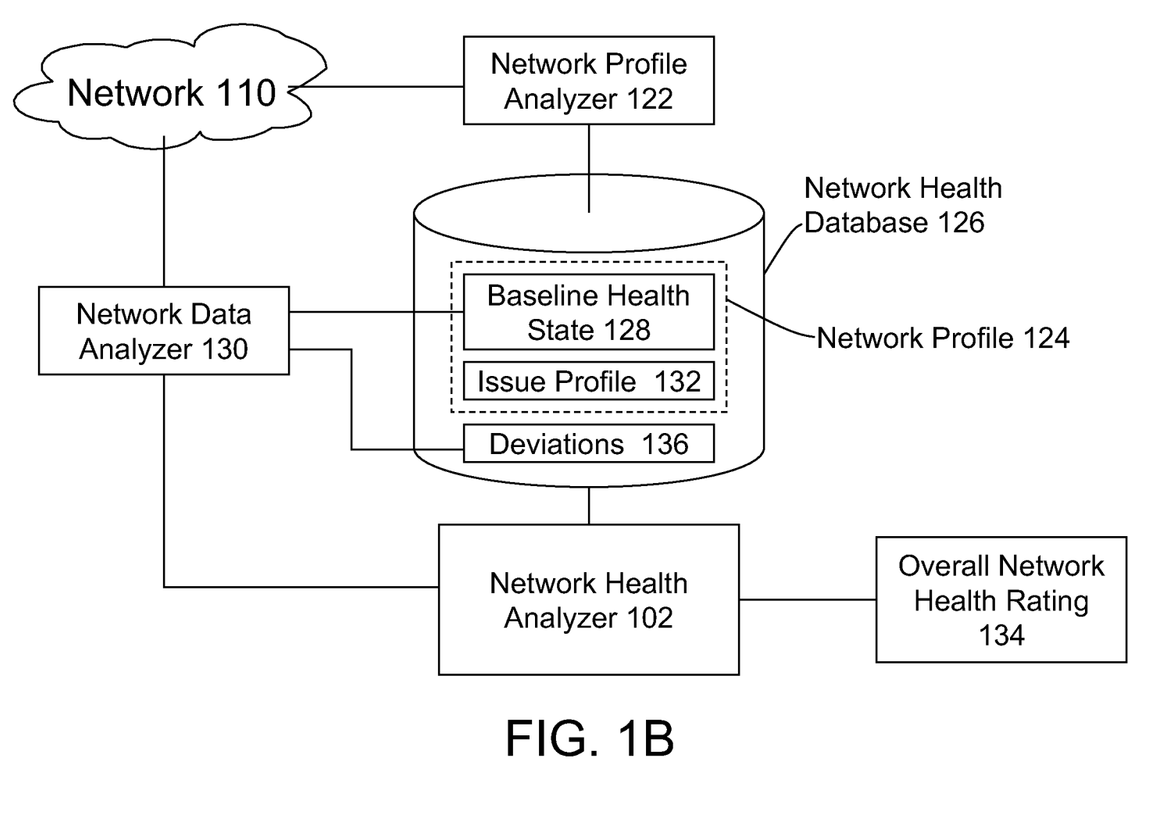

As illustrated in FIG. 1B, a network profile analyzer 122 may be implemented in system 100. The network profile analyzer (122) determines an appropriate network profile 124 for the network (110). This determination may involve technical review of network design and technical analysis of device performance and compliance data, for example. In some embodiments, users such as network experts, support personnel and network operation personnel may provide inputs into the network profile analyzer (122) through a user interface such as 106 of FIG. 1A. As a result, these inputs may be received and used by the network profile analyzer (122) in determining the appropriate network profile (124).

To determine the network profile (124), the network profile analyzer (122) may analyze network configuration and/or service configuration data, subscriber information, etc. In some embodiments, the network profile analyzer determines a number of characteristics in one or more network categories for the network (110). For example, one such network category may be "places-in-network" (PIN). Possible characteristics for this category may be "core", "edge", or "aggregation". Thus, if the network (110) is operated by a primary carrier at the core and used to provide services to large enterprises, secondary carriers, the characteristic in this network category for the network (110) may be "core".

Another network category may be "application services". This category pertains to what types of application services the network (110) provides. Possible characteristics for this category may be "video", "voice", "storage", or "data center". Thus, if customers uses the network (110) to run video related applications such as video distribution and streaming, the characteristic in this category for the network (110) may be "video".

One another network category may be "network services". This category pertains to what network services the network (110) provides to the customers. For example, where the customers run video-related applications, the network (110) may provide QoS based network services and/or multicast services. As a result, the characteristic in this network category for the network (110) may be determined as a combination of QoS and Multicast.

Still another network category may be "transport". This category pertains to one or more types of transports used in the network (110), and may take one or more characteristics such as "IP routing", "MPLS", "ATM POS", "Cable", "Ethernet", "Wireless", etc. For example, if the network (110) uses IP routing as transport to carry traffics from the customers, then the characteristic in this network category for the network (110) is "IP routing".

Yet another network category that may be used to characterize a network such as 110 of FIG. 1A, is "infrastructure". This network category pertains to what type of network elements, links, infrastructure elements the network (110) deploys. Some possible characteristics in this category may be types of vendor-supplied devices that are deployed in the network (110) and take one or more characteristics, for the purpose of illustration, "CRS", "GSR", "7600", "7500" (which refer to corresponding network elements commercially available from Cisco Systems, Inc., San Jose, Calif.).

For example, where the network uses 7600 as infrastructure network elements, the characteristic in this network category for the network (110) may be "7600".

In some embodiments, network profile analyzer 122 is a part of the network health analyzer (102). The result (i.e., network profile 124) of analysis performed by the network profile analyzer 122 may be stored in a network health database 126 (which, in a particular embodiment, may also be used by the network health analyzer 102 to store or retrieve data).

The network profile (124) may, but is not limited to, comprise one or more network characteristics, a baseline health state 128 that correspond to the network characteristics, and an issue profile (such as 132 of FIG. 2) that correspond to the network characteristics. In the present example, the network characteristics for the network (110) may be determined as "Core" for PIN, "Video" for Application Services, "Multicast and QoS" for Network Services, "IP routing" for Transport, "7600" for Infrastructure, etc. Accordingly, the baseline health state (128) may comprise a number of benchmarks for dynamic ones of these network characteristics. For example, while PIN may be a relative static characteristic of the network, a network characteristic such as "Video" can be measured, for instance, by one or more IEEE parameters such as end-to-end jitter, end-to-end delay, end-to-end packet loss, etc. using data collected from the network (110). Similarly, the "Multicast" characteristic may be measured by number of video streams or IGMP latency; the "QoS" characteristic may be measured by class and queue properties such as queue depth, bandwidth utilization within a number of traffic classes, packet drops, etc. The "IP routing" characteristic may be measured by IGP optimization properties such as convergence, protocol timers, number of routes, etc. The "7600" characteristic may be measured by utilization properties such as CPU, memory, link usages, etc, by redundancy properties such as RP failover timers (NSF/SSO), or by performance properties such as MTBF, etc.

For instance, given the measurement properties relevant to the network characteristics as described above, the corresponding benchmarks for these measuring parameters or properties may be set as jitter no more than 30 ms; delay no more than 150 ms; and packet loss no more than 1%; IGMP latency no more than 250 ms; BGP keepalive interval no more than 10 sec; OSPF hello interval between 10 and 30 sec; classes of service no more than three; queue depth no more than x packets for a particular interface, where x may be a suitable number in unit of bytes; CPU utilization no more than 60%; memory utilization no more than 60%; etc.

In some embodiments, a network data analyzer 130 uses these benchmarks defined in the baseline health state (128) to determine whether the data collected from the network (110) pertaining to network operation shows deviations from these benchmarks. If there are deviations, the network data analyzer determines how serious these deviations are relative to the acceptable ranges. Even if the data does not show a deviation for a particular measurement property, the network data analyzer may determine how close the acceptable range may be violated. The results of this data analysis performed by the network data analyzer (130) may be deviations (136 of FIG. 1B in the network health database) one or more data points (208 of FIG. 2) that may be used by the network health analyzer (102 of FIG. 1A) to determine the overall health rating (134 of FIG. 2).

3.1 Example Network Health Analyzer

Figure 2:
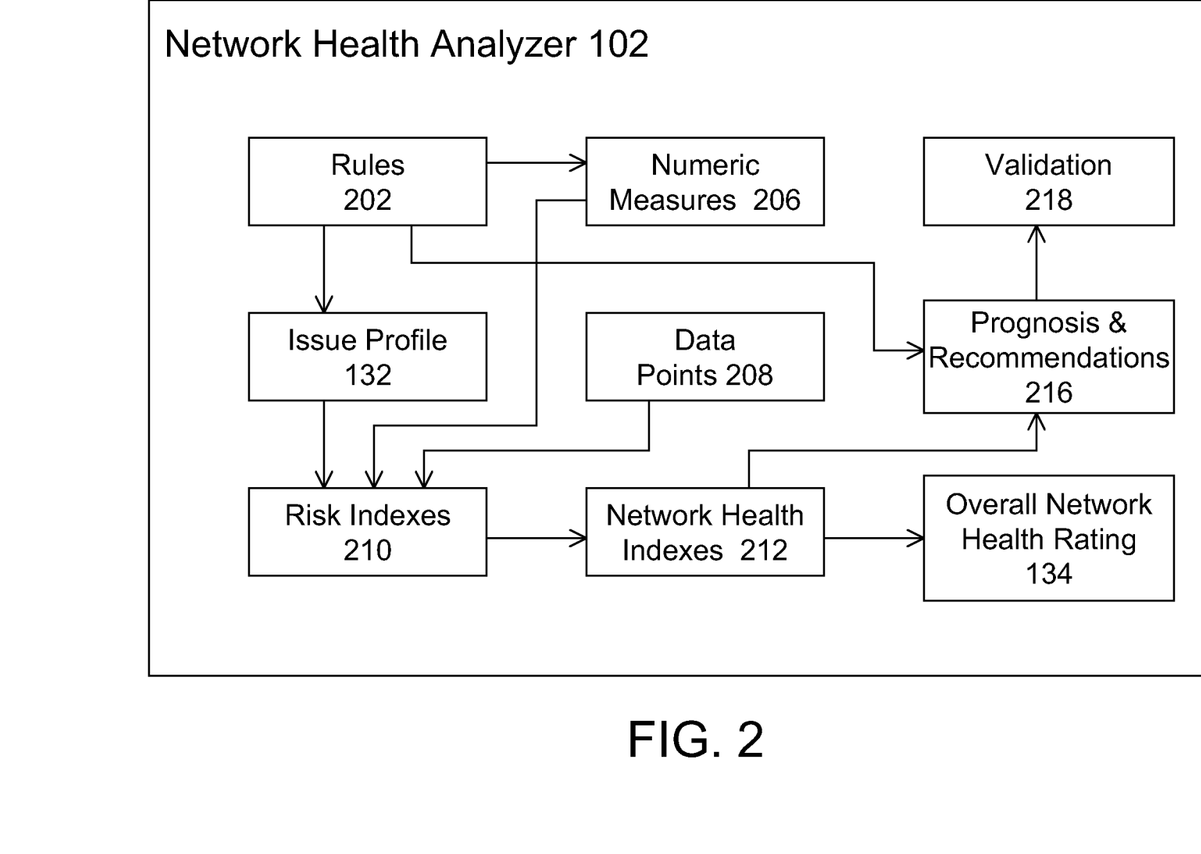
FIG. 2 illustrates an example network health analyzer.

FIG. 2 illustrates an example network health analyzer. In an embodiment, a network health analyzer 102 may comprise a number of data components and logic components, a subset of which are illustrated in FIG. 2.

3.1.1 Rules and Issue Profile

Based on provisioning and configuration information collected from the network 110 and rules 202 imported from the knowledge base 104, the network health analyzer may initially determine the network profile. For example, the provisioning and configuration information may indicate that the network 110 is formed by a number of network devices with high capacity that are used to carry traffic over long distances for many other smaller tributary networks. Based on the rules 202 and/or network patterning information from the knowledge base 104, the network health analyzer 102 may determine that the network 110 is of a core service provider network profile. For example, this determination of a particular network profile may be made by evaluating numbers, types and/or locations of network elements deployed in the network 110.

Based on the network profile, a particular default issue profile from the knowledge base may be used to initially define a particular issue profile 132. An issue profile is a representation of likely health problems in the network of that type.

In one embodiment, issues in a default issue profile for a core service provider type of network include, but are not limited to, 1) latency caused by traffic re-routing, 2) BGP packet malformation that may cause crashes in routing protocol operations, 3) incorrect unidirectional link detection (UDLD) configuration, 4) inadequate hardware failover redundancy of core routers or other network devices, 5) frequent SPF churns (in OSPF routing protocol operations), 6) memory overrun in generic routing protocol operations, 7) mistaken enablement of IP directed broadcast, 8) express-forwarding-class packet drops in core network devices, 9) lack of redundancy support for OSPF area border routers, 10) high CPU utilization in core network devices, etc.

The particular issue profile 132 may be further updated, deleted, modified, or otherwise refined, for example, by a user using a user interface such as 106 of FIG. 1A. In such a case, some or all parameters and thresholds in the particular issue profile may be altered. The network health analyzer 102 may also accept input from the user for adding one or more specific issues for the network 110 and define any parameters and thresholds associated with each of the specific issues.

3.1.2 Rules and Numeric Measures

As shown in FIG. 2, based in part on rules 202 imported from the knowledge base 104, the network health analyzer 102 may determine a set of numeric measures 206 that are to be used to evaluate impact of any issue (defined in the issue profile) on operation of the network 110. For example, based on the rules 202 and/or network patterning information from the knowledge base 104, the network health analyzer 102 may first select a particular default set of numeric measures for the network 110 among a number of default sets of numeric measures stored in the knowledge base 104. Subsequently, the particular default set of numeric measures from the knowledge base may be used to initially define a particular set of numeric measures 206.

For example, in one embodiment, a default set of numeric measures from the knowledge base may comprise 1) a weight factor (characterizing the importance of an issue), 2) an extent-of-impact factor (measuring how many devices or network spans are affected by an issue), 3) an application-criticality factor (measuring the importance of applications—hosted in the network—affected by an issue), 4) a network-region factor (related to the scope of the network affected by an issue, for example, whether the issue impacts core network region, distribution network region, edge network region, etc.), 5) a statistical-significance factor (indicating whether an issue is a frequently recurring issue, a sporadically recurring issue or an isolated event), 6) a workaround-effectiveness factor (measuring whether there is a workaround available and how effective such a workaround is), and 7) an X-factor (measuring an subjective perception of seriousness of an issue based on empirical data collected for this and other networks and feedbacks from an customer operating this network and various other customers operating other networks).

The particular set of numeric measures 206 that is initially defined based in part on the rules 202 may be further updated, deleted, modified, or otherwise refined, for example, by a user using a user interface such as 106 of FIG. 1A. In such a case, some or all measures in the particular set of numeric measures parameters of any such measure may be altered. The network health analyzer 102 may also accept input from the user for adding one or more specific numeric measures for the network 110 and define any parameters (such as default values) and thresholds associated with each of the specific numeric measures.

3.1.3 Data Points and Numeric Values

Data points that represent compliances or deviations (136 of FIG. 1B) from the relevant benchmarks established for the network profile of the network (110 of FIG. 1A) can be used to determine numeric values that correspond to the particular set of numeric measures 206 for each issue in the issue profile 132.

For example, an issue in the issue profile 132 of the network 110 may be latency caused by traffic re-routing. Such traffic-re-routing (for example, linking New York and Tokyo through London) may occur because direct link capacity between two points (i.e., between New York and Tokyo) in the network has been under-provisioned. As a result, through traffic statistical data collected through the network data collector (108), the network health analyzer 102 may receive data points representing deviation (136) from the established benchmarks. For example, the data points may indicate that an excessive amount of real time service traffic (for example, packets, phone calls, messages, etc., generated by subscribers and customers) has been overflown or re-routed over alternative routes.

Since the re-routing paths take time to set up, the data points may indicate there is an excessive latency (that is deviated from a certain benchmark value range) in effectuating alternative traffic flows or in transporting the overflown traffic. As an example, the network health analyzer 102 may determine that average latency for the re-routed service traffic is 200 ms in the network 110, for example. Based on this average latency, since 200-ms latency may cause many applications (for example, signaling applications) to exceed some timer values that these applications are required to comply, the network health analyzer 102 may determine a corresponding value for the application-criticality measure.

Similarly, the network health analyzer 102 may determine, for the issue of latency caused by re-routed traffic, other values related to other numeric measures other than the application-criticality measure. For example, for the issue of latency, the extent of impact (i.e., how many devices and network spans are degraded) may be zero since the network devices and spans carrying the re-routed traffic may have sufficient capacity to accommodate the re-routed traffic. Similarly, the network health analyzer 102 may determine a network region type that the issue affects the most. For example, the latency issue may affect mainly an edge region of the network. In this manner, values relating to the other numeric measures (for example, in addition to the above, statistical significance, workaround effectiveness, and X-Factor) may also be determined.

In some embodiments, computation of monitored data (such as computation of latency) may be performed in part or in whole by one or more external entities to the network health analyzer 102. In such embodiments, the network health analyzer 102 may collect the partial or full results (e.g., latency) of the computation from the one or more external entities. As a result, the network health analyzer collects or acquires one or more data points 208 about all the issues in the issue profile 132.

Based on the data points collected and parameters/thresholds associated with an issue in the issue profile 132, the network health analyzer 102 determines numeric values that correspond to the particular set of numeric measures 206 for the issue. In the present example, the issue is latency caused by re-routing. In one embodiment, the data point 208 collected by the network health analyzer 102 allows the analyzer to determine corresponding numeric values for most numeric measures in the set of numeric measures. For example, since application criticality of the latency issue is high, a numeric value of 50 in a set of discrete values 10 (low criticality), (medium criticality), and 50 (high criticality) may be assigned to the application-criticality factor. Likewise, since no network devices or spans are degraded, the extent-of-impact factor may be given a numeric value of 0. Furthermore, since the network region affected by the latency is the edge region, services provided to customers may be directly affected. Thus, a numeric value of 30 in a set of discrete values 10 (core network region), 20 (distribution network region), and 30 (edge network region) may be assigned to the network-region factor.

Parameters/thresholds that are associated with this issue as defined in the issue profile 132 may also be used to determine corresponding numeric values for the remaining numeric measures in the set of numeric measures. For example, based on parameters/thresholds that are associated with the latency issue, the numeric value of the weight factor may be set to 5 in the range of 1 through 9. Other weight values and ranges may be used in other embodiments.

3.1.4 Risk Indexes and Network Health Indexes

Risk indexes 210 as shown in FIG. 2 are un-normalized numeric values that each represent an impact of corresponding issue on operation of the network 110. In one embodiment, a risk factor for a corresponding issue may be computed by a formula. In one embodiment, a formula as shown below may be used to derive a risk factor for an issue:

Risk Factor=$(B+C+D+E+F*G)*H$

In an embodiment, B is a weight factor. C is an extent-of-impact factor. D is an application-criticality factor. E is a network-region factor. F is a statistical-significance factor, G is a workaround-effectiveness factor, and H is an X-factor. Once numeric values for the above mentioned numeric measures are determined, risk factors for all the issues in the issue profile are determined based on the formula.

Network health indexes 212 as shown in FIG. 2 are normalized numeric values, each of which represents a contribution of an associated issue to an overall health rating for the network 110. In one embodiment, a network health index for an issue may be derived based on a formula as follows:

Network Health index=$(RI_{max}-RI)*RI_{max}/10$

The network health index is for a particular issue, $RI_{max}$ is the maximum value among all the risk indexes previously calculated, and RI is a risk index for the particular issue. For example, the issue of express-forwarding-class packet drops in core network devices may produce a highest value, say 336, for a corresponding risk index among all the risk indexes. On the other hand, a risk index, RI, for the latency problem may have a numeric value of 115. Based on the above formula, therefore, a network health index for the latency problem may have a value of 7.69 on a scale of 0 through 10.

3.1.4 Overall Health Rating, Prognosis and Recommendation, and Validation

Once the network health indexes are determined, an overall health rating as illustrated in 134 of FIG. 2 may be determined by averaging all the network health indexes for all the issues in the issue profile.

The network health indexes 212, in combination with the rules 202 imported from the knowledge base 104, may be used by the network health analyzer 102 to make a prognosis and recommendations (216) for health of the network 110 and for avoiding or lessening impacts from high priority issues. For example, the network health analyzer 102 may determine that the latency issue, while important, is not the most urgent among all the issues. The network health analyzer may determine that the most critical issue in the health of the network 110 is the issue relating to packet drops for express forwarding services. The underlying reason may be that the express forwarding services are used by customers to run mission-critical operations. Through the rules 202 imported from the knowledge base 104 and data collected from the network 110, the network health analyzer 102 may determine that, if the issue relating to express forwarding services is solved, other issues may also be improved. For example, the re-routing latency issue may be indirectly caused by congestion problems related to the express forwarding services. Therefore, once the express forwarding issue is resolved, the re-routing latency issue may be significantly improved.

In some embodiments, the network health analyzer 102 continues monitoring the health of the network 110. Thus, the analysis leading to the overall health rating for the network may be repeated from time to time. For example, such monitoring and analyzing may be conducted on a daily basis, weekly, seasonally, or yearly. The results from monitoring and analyzing may provide trend data for various risk indexes, network health indexes, an overall health rating, or prognoses and recommendations, individually or in combination.

Furthermore, validation 218 of the prognosis and recommendations 216 may also be implemented within the network health analyzer 102 to validate the previously made prognosis (for example, if the recommendations were not followed) and recommendations (for example, if the recommendation were followed).

3.2 Example Operations

Figure 3:
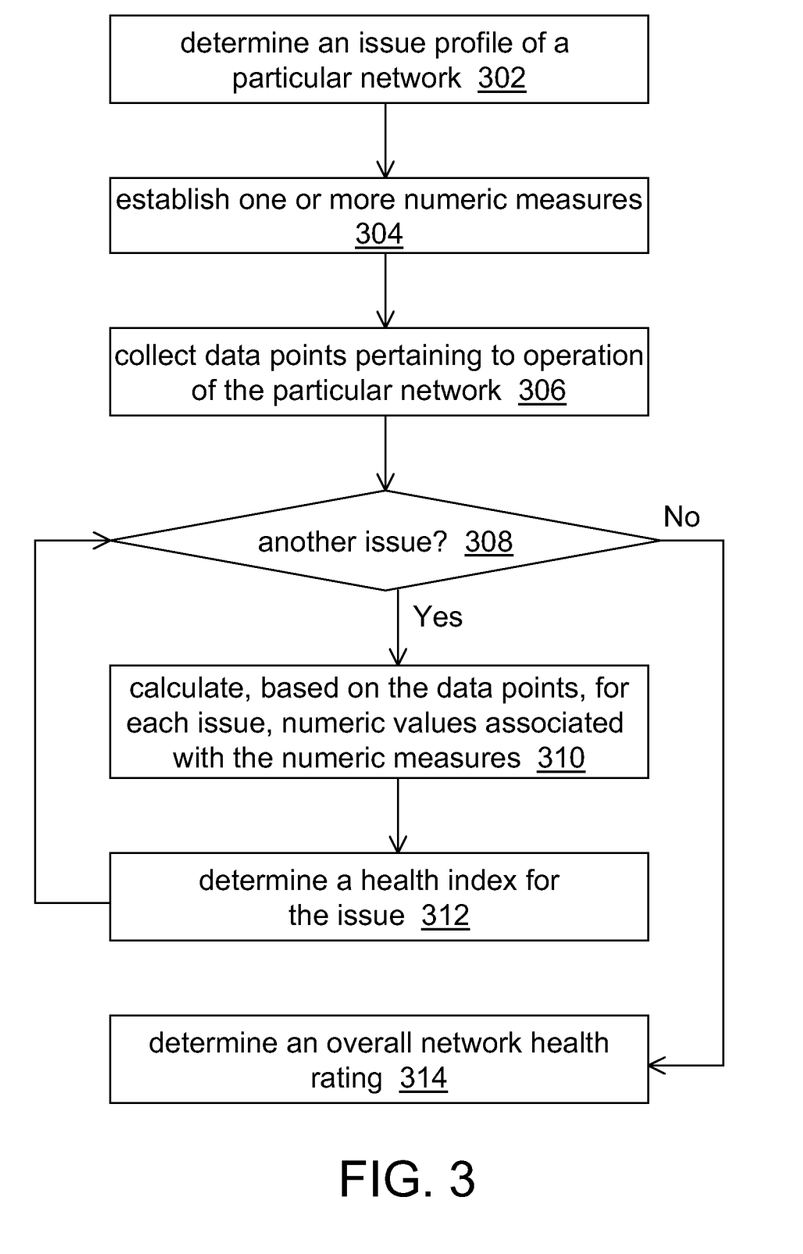
FIG. 3 illustrates an example process flow.

FIG. 3 illustrates an example process flow. To illustrate how network health analysis can be provided by the network health analyzer 102 in one embodiment, an example, based on FIG. 1A and FIG. 2, is now described.

In block 302 of FIG. 3, the network health analyzer 102 determines an issue profile 132 of a particular computer network 110. The issue profile comprises a set of one or more particular issues that affect operation of the particular network 110. To illustrate a clear example, the particular computer network may be a service provider network. In some embodiments, the one or more particular issues comprise at least an issue that does not immediately impact service availability of the particular network. Rather, it may indicate that the network is not operating in its most optimum condition.

In block 304 of FIG. 3, the network health analyzer 102 establishes a set of numeric measures. For example, a numeric measure in the set of numeric may measure 1) the extent of impact of an issue on the operation of the particular network, 2) application criticality of an issue in the particular network, 3) location criticality of an issue in the particular network, 4) statistical significance (frequent repetition, sporadic repetition, or isolated event) of an issue on the operation of the particular network, 5) effectiveness of workarounds, 6) a subjective weight of an issue that affects the operation of the particular network, etc.

The numeric measures established by the network health analyzer may be common to all issues in the set of one or more particular issues in the issue profile. Furthermore, a numeric measure in the set of numeric measures may have a value within an associated range of numeric values. The numeric measure with its value for an issue represents an amount of impact of the issue on the operation of the particular network.

In block 306 of FIG. 3, the network health analyzer 102 collects one or more data points pertaining to the operation of the particular network. The one or more data points may be collected from the network 110 via the network data collector 108. The one or more data points may include such data as real time raw traffic data, real time raw statistical data, non-real time (processed) statistical data, long-term trend data, provisioning data, configuration data, control plane data, event and alarm data, etc. Apart from the data collected from the network, sources of data other than the network may also be used to provide information about the network 110 to the network health analyzer 102.

Subsequently, the network health analyzer performs processing steps for each issue in the set of one or more particular issues in the issue profile. In block 308 of FIG. 3, the network health analyzer 102 determines whether there is any issue yet to be processed. If so, blocks 310 and 312 are performed for such an issue.

In block 310, the network health analyzer 102 calculates, based on the one or more data points collected from the particular network, a set of numeric values for the issue. Each numeric value in the set of numeric values is associated with a numeric measure in the set of numeric measures.

In block 312, based on the set of one or more numeric values for the issue, the network health analyzer determines a health index that represents a contribution of the issue to an overall health rating.

If block 308 determines that all the issues have been processed, then at block 314 the network health analyzer 102 determines corresponding health indexes individually for all the issues in the issue profile.

In some embodiments where the set of numeric measures comprises an extent-of-an impact factor, an application-criticality factor, a location-criticality factor, a statistical-significance factor, an effectiveness-of-workarounds factor, and a subjective-weight factor, of the issue; the network health analyzer 102 calculates a numeric sum of the extent-of-an impact factor, the application-criticality factor, the location-criticality factor, and a multiplicative product of the statistical-significance factor and the effectiveness-of-workarounds factor, of the issue. The network health analyzer 102 then determines a risk factor of the issue. Such a risk factor may be determined as a multiplicative product of the numeric sum and the subjective-weight factor in a particular embodiment.

The network health analyzer 102 may calculate the contribution of the issue to the overall health rating. For example, the network health analyzer 102 may determine a risk factor of the issue (for example, as described above). This determination may be repeated for all the issues in the issue profile to yield a plurality of risk factors. From these risk factors, the network health analyzer 102 determines a highest risk factor among issues. The network health analyzer 102 may compute a ratio of a difference between the risk factor of the issue and the highest risk factor over the highest risk factor. The contribution of the issue to the overall health rating may be determined by the network health analyzer 102 as a multiplicative product of the ratio and a scaling factor.

Thereafter, based on all health indexes that represent contributions of all issues in the set of one or more issues, the network health analyzer determines, and subsequently stores, an overall health rating that represents health of the particular network.

The above steps that determine the overall health rating may be repeated for one or more different times. For example, the steps may be repeated periodically so that trend information about the network health may be obtained and monitored.

4.0 Implementation Mechanisms—Hardware Overview

Figure 4:
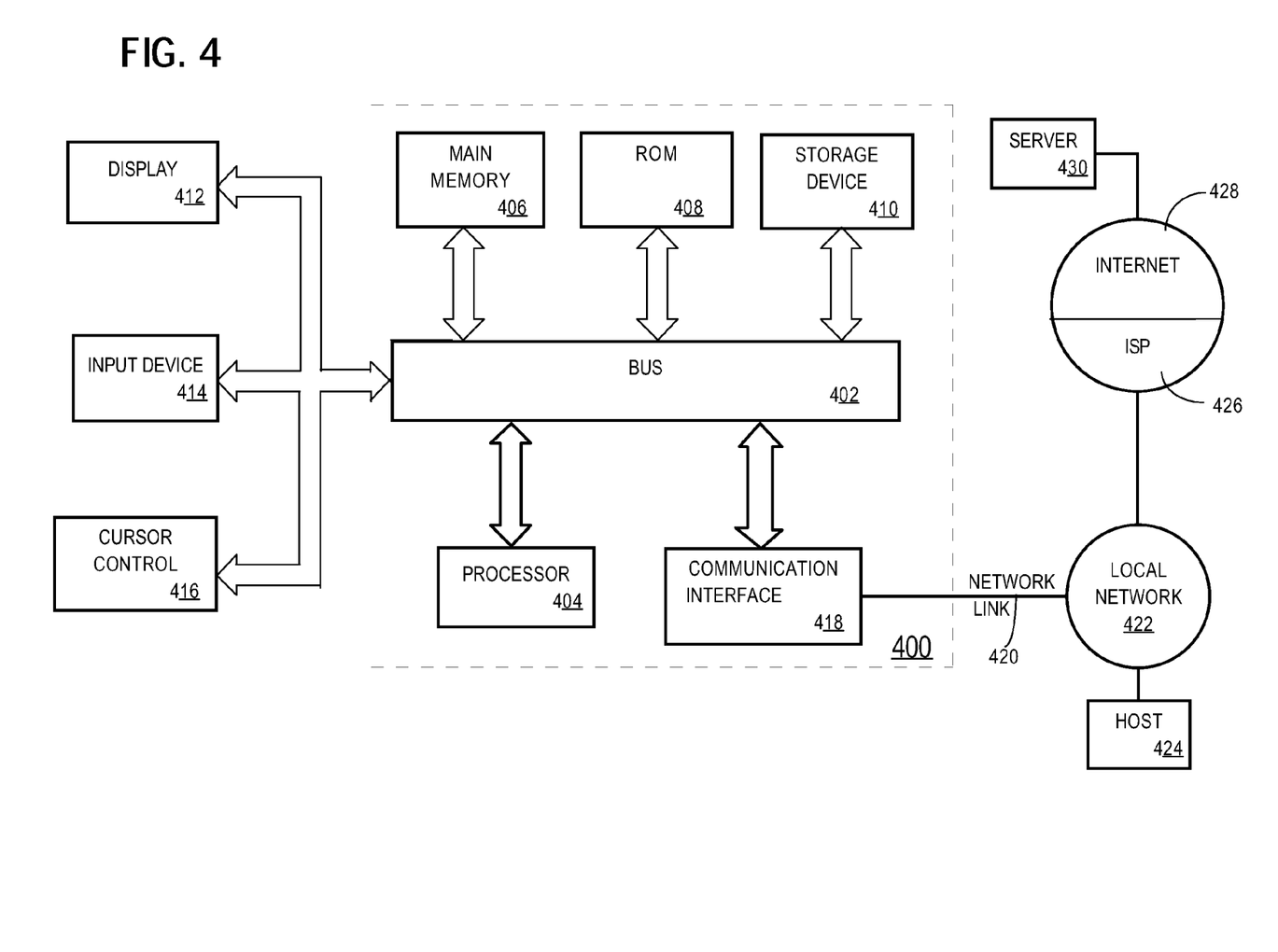
FIG. 4 illustrates a computer system.

FIG. 4 illustrates a computer system 400 upon which embodiments of the techniques for providing security for fiber-based communications may be implemented. A preferred embodiment is implemented using one or more computer programs running on computer system 400, which is operatively coupled to the backplane of a network infrastructure element such as, for example, a router or a switch.

Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

In one embodiment, computer system 400 is used for providing security for fiber-based communications. According to this embodiment, security of fiber-based communications is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry or other hardware-based logic may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for security for fiber-based communications as described herein.

The received code may be executed by processor 404 as it is received, and/or stored in storage device 410, or other non-volatile storage for later execution. In this manner, computer system 400 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising:
   in a database, creating two or more issue profiles each applicable to different network profiles with different characteristics wherein each of the different network profiles is for a different data communications network;
   determining, based at least in part on a network configuration of a particular network, a particular network profile for the particular network, wherein the network configuration of the particular network includes a network characteristic pertaining to a type of application services traffic carried using the particular network, wherein the network characteristic is determined using at least one of network parameters measuring end-to-end jitter, end-to-end delay, or end-to-end packet loss for the particular network, and wherein the network characteristic comprises one of a video characteristic, voice characteristic, storage characteristic, or a data center characteristic;
   selecting, from the two or more issue profiles in the database, an issue profile for a particular network, based at least in part on the particular network profile including the network characteristic, of the particular network;

modifying the issue profile in response to receiving input that specifies removing or adding at least one issue to the issue profile, wherein the issue profile comprises a set of one or more particular issues that can affect operation of the particular network, and wherein at least one of the set of one or more particular issues does not immediately impact service availability of the particular network;

collecting one or more data points pertaining to the operation of the particular network, wherein the one or more data points comprise a first data point, corresponding to a first network data type, which is collected from the particular network using a first communication link and a second data point, corresponding to a second network data type, which is collected from the particular network using a second communication link;

determining and storing, based on health indexes that represent contributions of all issues in the set of one or more particular issues, an overall health rating that represents health of the particular network;

wherein the method is performed by one or more computing devices.

2. The method of claim 1, wherein at least one of the data points represents either compliance or deviation from a benchmark value range.

3. The method of claim 1, further comprising establishing a set of numeric measures that is common to all issues in the set of one or more particular issues in the issue profile, wherein a numeric measure in the set of numeric measures comprises a value, for an issue, within an associated range of numeric values and wherein the numeric measure represents an amount of impact of the issue on the operation of the particular network.

4. The method of claim 1, further comprising establishing a set of numeric measures that is common to all issues in the set of one or more particular issues in the issue profile, wherein a numeric measure in the set of numeric measures represents an extent of an impact of the issue on the operation of the particular network.

5. The method of claim 1, further comprising establishing a set of numeric measures that is common to all issues in the set of one or more particular issues in the issue profile, wherein a numeric measure in the set of numeric measures represents a location criticality of the issue in the particular network.

6. The method of claim 1, further comprising establishing a set of numeric measures that is common to all issues in the set of one or more particular issues in the issue profile, wherein a numeric measure in the set of numeric measures represents a statistical significance of the issue on the operation of the particular network.

7. The method of claim 1, further comprising establishing a set of numeric measures that is common to all issues in the set of one or more particular issues in the issue profile, wherein a numeric measure in the set of numeric measures represents an effectiveness of workarounds for the issue that affects the operation of the particular network.

8. The method of claim 1, further comprising establishing a set of numeric measures that is common to all issues in the set of one or more particular issues in the issue profile, wherein the set of numeric measures comprises an extent-of-an impact factor, an application-criticality factor, a location-criticality factor, a statistical-significance factor, an effectiveness-of-workarounds factor, and a subjective-weight factor, of the issue.

9. The method of claim 1, wherein the contribution of an issue in the set of one or more particular issues to the overall health rating is calculated by:

determining a risk factor of the issue;
determining a highest risk factor among issues in the issue profile;
calculating a ratio of a difference between the risk factor of the issue and the highest risk factor over the highest risk factor; and
determining the contribution of the issue to the overall health rating as a multiplicative product of the ratio and a scaling factor.

10. The method of claim 1, further comprising:
for each issue in the set of one or more particular issues in the issue profile:
calculating, based on the one or more data points collected from the particular network, a set of numeric values;
determining, based on the set of numeric values for the issue, the health index that represents a contribution of the issue to an overall health rating.

11. A data processing system comprising:
one or more processors;
a knowledge base configured to create two or more issue profiles in a database, wherein each of the two or more issue profiles applies to a different network profile with different characteristics;
a network collector configured to collect one or more data points pertaining to operation of a particular network, wherein the one or more data points comprise a first data point, corresponding to a first network data type, which is collected from the particular network using a first communication link and a second data point, corresponding to a second network data type, which is collected from the particular network using a second communication link; and
a network health analyzer configured to:
determine, based at least in part on a network configuration of the particular network, a particular network profile for the particular network,
wherein the network configuration of the particular network includes a network characteristic pertaining to a type of application services traffic carried using the particular network, wherein the network characteristic is determined using at least one of network parameters measuring end-to-end jitter, end-to-end delay, or end-to-end packet loss for the particular network, and wherein the network characteristic comprises one of a video characteristic, voice characteristic, storage characteristic, or a data center characteristic;
select, from the two or more issue profiles stored in the database, an issue profile for the particular network, based at least in part on the particular network profile including the network characteristic, of the particular network;
modify the issue profile in response to receiving input that specifies removing or adding at least one issue to the issue profile, wherein the issue profile comprises a set of one or more particular issues that can affect operation of the particular network, and wherein at least one of the set of one or more particular issues does not immediately impact service availability of the particular network; and
determine and store, based on health indexes that represent contributions of all issues in the set of one or more particular issues, an overall health rating that represents health of the particular network.

12. The data processing system of claim 11, wherein at least one of the data points represents either compliance or deviation from a benchmark value range.

13. The data processing system of claim 11, wherein the network health analyzer is further configured to establish a set of numeric measures that is common to all issues in the set of one or more particular issues in the issue profile, wherein a numeric measure in the set of numeric measures comprises a value, for an issue, within an associated range of numeric values and wherein the numeric measure represents an amount of impact of the issue on the operation of the particular network.

14. The data processing system of claim 11, wherein the network health analyzer is further configured to establish a set of numeric measures that is common to all issues in the set of one or more particular issues in the issue profile, wherein a numeric measure in the set of numeric measures represents an extent of an impact of the issue on the operation of the particular network.

15. The data processing system of claim 11, wherein the network health analyzer is further configured to establish a set of numeric measures that is common to all issues in the set of one or more particular issues in the issue profile, wherein a numeric measure in the set of numeric measures represents a location criticality of the issue in the particular network.

16. The data processing system of claim 11, wherein the network health analyzer is further configured to establish a set of numeric measures that is common to all issues in the set of one or more particular issues in the issue profile, wherein a numeric measure in the set of numeric measures represents a statistical significance of the issue on the operation of the particular network.

17. The data processing system of claim 11, wherein the network health analyzer is further configured to establish a set of numeric measures that is common to all issues in the set of one or more particular issues in the issue profile, wherein a numeric measure in the set of numeric measures represents an effectiveness of workarounds for the issue that affects the operation of the particular network.

18. The data processing system of claim 11, wherein the network characteristic comprises an extent-of-an impact factor, an application-criticality factor, a location-criticality factor, a statistical-significance factor, an effectiveness-of-workarounds factor, and a subjective-weight factor, of the issue.

19. The data processing system of claim 11, wherein the network health analyzer is further configured to:
determine a risk factor of the issue;
determine a highest risk factor among issues in the issue profile;
calculate a ratio of a difference between the risk factor of the issue and the highest risk factor over the highest risk factor; and
determine the contribution of the issue to the overall health rating as a multiplicative product of the ratio and a scaling factor.

20. The data processing system of claim 11, wherein the network health analyzer is further configured to:
for each issue in the set of one or more particular issues in the issue profile:
calculate, based on the one or more data points collected from the particular network, a set of numeric values;
determine, based on the set of numeric values for the issue, the health index that represents a contribution of the issue to an overall health rating.

* * * * *

UNITED STATES PATENT AND TRADEMARK OFFICE
CERTIFICATE OF CORRECTION

PATENT NO. : 9,602,370 B2  
APPLICATION NO. : 14/145527  
DATED : March 21, 2017  
INVENTOR(S) : Jitendra Golani, Sandeep Dhingra and Sameer Padhye It is certified that error appears in the above-identified patent and that said Letters Patent is hereby corrected as shown below:

On the Title Page

In Column 1, Item (73), under Assignee: delete:
"Cosco Technology, Inc., San Jose, CA (US)"

And insert:
--Cisco Technology, Inc., San Jose, CA (US)--

Signed and Sealed this
Twenty-ninth Day of May, 2018

Andrei Iancu
*Director of the United States Patent and Trademark Office*